Patented Feb. 24, 1953

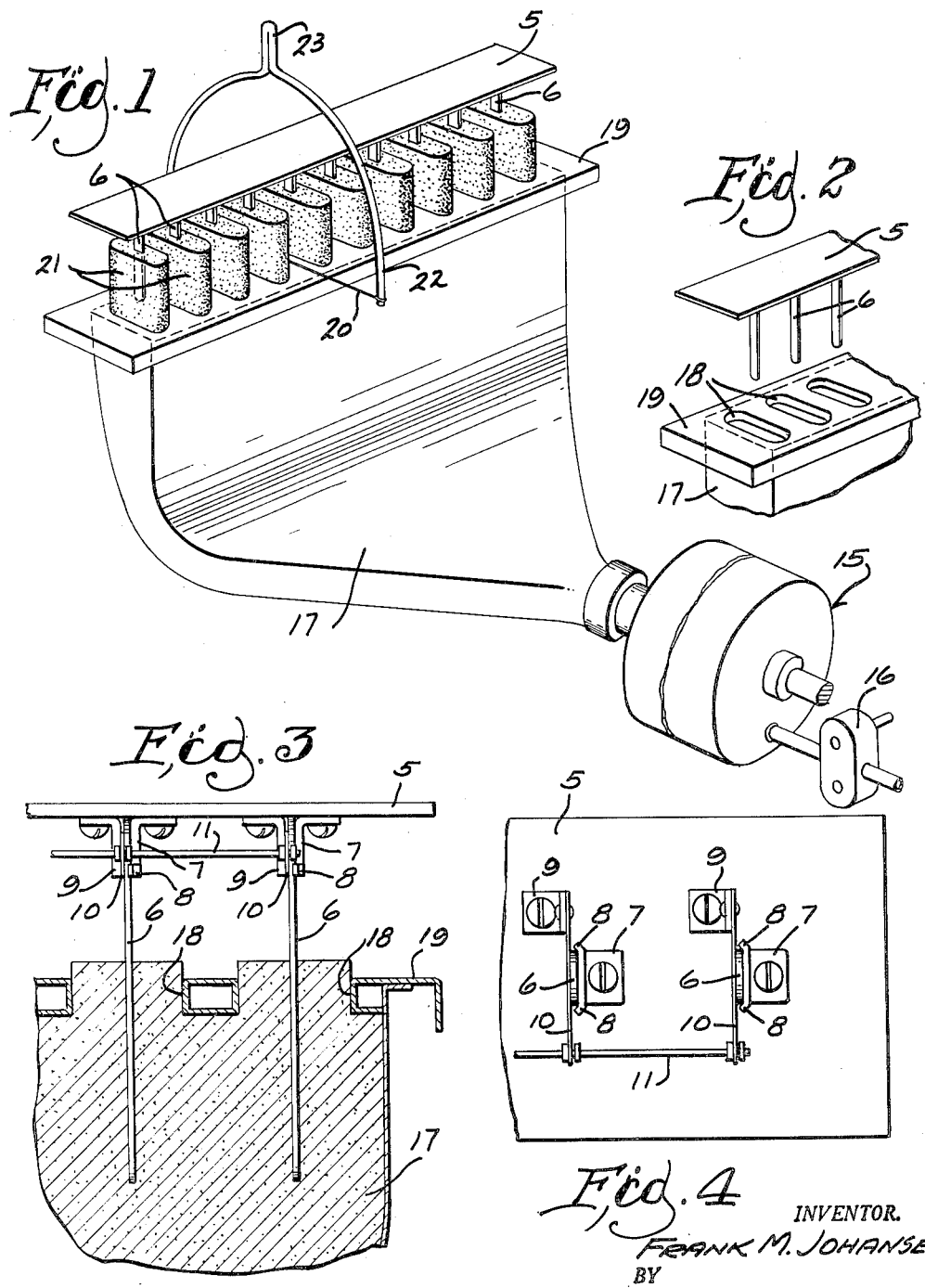

2,629,346

UNITED STATES PATENT OFFICE 2,629,346

APPARATUS AND METHOD OF ICE-CREAM BAR MANUFACTURE

Frank M. Johansen, Madison, Wis.

Application August 21, 1946, Serial No. 691,951

10 Claims. (Cl. 107—54)

This invention relates to improvements in the art of manufacturing ice cream bars and other frozen confections. For the purpose of this invention, all such frozen bars are referred to as ice cream bars, whether made with milk or water. At present, the ice cream is flowed into molds which are then chilled to set the ice cream in the mold. It is an object of the invention to provide an extrusion process of making ice cream bars and suitable apparatus for the practice of that process. More specific objects of the invention will be better apparent in the light of the following disclosure thereof.

In the drawings:

Fig. 1 is a view in perspective of apparatus in use in the practice of the present invention.

Fig. 2 is a fragmentary detailed view in perspective showing the apparatus positioned preparatory to the initiation of the process.

Fig. 3 is an enlarged fragmentary detailed view in cross section through apparatus employed in the second step of the process.

Fig. 4 is a fragmentary inverted plan view on the scale of Fig. 3 showing the stick carrier employed to position the sticks in the bars.

While the present invention may be used for the manufacture of ice cream bars with or without sticks such as are commonly used to manipulate such bars while eating the ice cream, the invention has particular reference to the type of bar which is mounted on a stick and accordingly it will be described primarily from the standpoint of bars of that type.

A wide variety of stick holders is available on the market, these being designed for use in connection with the molds previously referred to. While the present invention is not particularly concerned with the type of stick carrier employed, it is desirable for the purposes of the present invention that the carrier be of such a character that a certain amount of longitudinal pressure may be applied to the several sticks mounted therein. Accordingly, I shall describe a preferred type of carrier. My preferred carrier comprises a plate 5 which is imperforate so that the several sticks 6 abut the plate at their ends. Fastened to the lower face of the plate is a bracket 7 for each stick, each bracket having ears 8 laterally engaging the side margins of the stick to hold the stick at right angles to the plate.

As a companion to each bracket 7, there is a bracket 9 carrying a spring at 10 biased toward bracket 7 so that the pressure of the spring against the face of the stick 6 will hold such stick securely in the embrace of the ears 8 of bracket 7. A tie rod 11 preferably connects the free ends of the several springs 10 so that when the tie rod is pulled to the left as viewed in Fig. 3 all of the sticks will be simultaneously released for disengagement from their respective brackets.

The conventional continuous freezer diagrammatically illustrated at 15 is provided with the usual input mix pump 16 which operates continuously at such a rate that the partially frozen ice cream is expelled from the freezer at a time when freezing has progressed sufficiently so that the ice cream is form-sustaining but plastic without being hard. It is common practice in the industry to discharge the ice cream in this pasty condition into containers in which it is subsequently frozen hard.

Any other means for causing the ice cream to flow under pressure may be substituted. According to the present invention, I connect to such means, and preferably directly to the freezer, a gradually expanding delivery conduit 17 to receive the flow of ice cream. At its outer end, this conduit provides any desired number of openings 18 corresponding in shape to the cross section of the desired bar. These openings are preferably, although not necessarily, formed in the otherwise smooth and continuous surface of the terminal closure 19 over which a cut-off knife 20 may conveniently be reciprocated to sever the extruded ice cream bars 21 when these reach a predetermined length of projection from the apparatus. While any desired cut-off knife may be used, I have found it convenient to employ for this purpose a wire tightly stretched by a bow 22, which may be mechanically guided by contact of the wire 20 with the closure 19, or otherwise, and may, if desired, have a handle 23 for its manipulation.

The preferred method of practicing the invention is as follows:

The ice cream, frozen sufficiently hard to be form-sustaining, but not so hard that it is not plastic, is ejected from the freezer 15 into the expanding passage 17 toward the nozzle openings 18. Meantime, one of a number of carriers 5 previously loaded with sticks 6, is either positioned over the nozzle openings as shown in Fig. 2 or, as is preferable, is used to push its several sticks 6 downwardly through the nozzle openings 18 into the plastic ice cream in passage 17. The sticks are preferably dipped in water and chilled, or are at least chilled to increase the adhesion of the ice cream to the stick and I prefer to follow this procedure, although adhesion is good without either dipping or chilling.

Whether the carrier is held stationary in the position shown in Fig. 2, or is pushed downwardly to the position shown in Fig. 3, in either case the carrier plate 5 receives the thrust of the sticks 6 as such sticks are enveloped in the ice cream by relative movement between the sticks and the plastic mass of ice cream. Assuming that the preferred practice indicated in Fig. 3 is followed, the carrier is used to embed the sticks in the ice cream immediately after each set of extruded bars has been severed. Thereupon, as extrusion continues, the several bars emerging from the nozzle openings 18 in which they are formed will support and lift the sticks and carrier. When the bars have been extruded to the desired length, the cut-off knife 20 is rapidly moved along the surface of closure 19 to sever the several bars at that level. Thereupon the carrier 5 will be used to convey the bars elsewhere for further freezing or enrobing in chocolate or icing, or for any combination of these and other operations. As soon as one set of bars has been severed and moved away on a carrier 5, another carrier to which sticks have been assembled will be positioned to embed the sticks in the ice cream during the continued extrusion thereof from the nozzle openings 18.

When all freezing and enrobing operations on the respective bars have been completed, and the bars have been packaged in envelopes if desired, the tie rod 11 may be manipulated to withdraw the strong springs 10 for the release of the sticks, leaving the carrier free to be reloaded. With a series of carriers and one or more sets of extruding nozzles through which ice cream is extruded, the manufacture of ice cream bars can proceed at a very greatly accelerated rate as compared with the conventional use of molds for the manufacture of such bars. Assuming that the freezer 15 is the conventional, continuously operable freezer, the continuous production of extruded bars can proceed indefinitely without interruption.

While the operation is described as being preferably continuous for maximum economy, it will be understood that intermittent extrusion is within the contemplation of this invention and any desired number of nozzles may be used.

I claim:

1. A method of making ice cream bars which comprises the extrusion of form-sustaining but plastic ice cream, embedding a stick in the ice cream by relative movement therebetween along the line of extrusion, and severing the extruded ice cream between the point of extrusion and the stick.

2. A method of making an ice cream bar which comprises the continuous extrusion of form-sustaining but plastic ice cream, embedding a stick in the ice cream in the course and along the line of its continuous extrusion, and severing the extruded ice cream beyond the point of extrusion for leaving an extruded bar of such ice cream adherent to the stick.

3. The method recited in claim 2 in which the stick is held in the path of extrusion for envelopment in the extruded ice cream during extrusion thereof.

4. The method of claim 3 in which the stick is inserted into the ice cream prior to extrusion thereof and allowed to move with the extruded ice cream during extrusion.

5. A method of making ice cream bars which comprises the extrusion of form-sustaining but plastic ice cream, the introduction of a stick into the ice cream before any substantial amount of ice cream has been extruded, the continued extrusion of the ice cream with the enveloped stick, and the severance of the ice cream near the point of extrusion after the stick has passed said point.

6. A method of making ice cream bars which comprises the freezing and delivery of form-sustaining but plastic ice cream, the extrusion of the delivered ice cream at a plurality of points, the introduction of a battery of sticks into the ice cream before any appreciable volume of ice cream has been extruded, the continued extrusion of the ice cream with the sticks, and the severance of extruded bars of ice cream near the points of extrusion after the sticks have passed said points.

7. A method of making ice cream bars which consists in the extrusion of form-sustaining but plastic ice cream at a plurality of points as bars, positioning sticks severally to envelop such sticks in the ice cream bars during extrusion thereof, and severing the ice cream between said points and the sticks for leaving the ice cream supported by the sticks.

8. The method recited in claim 7 in which the sticks are held in the path of the extruded ice cream to be enveloped by the ice cream as it moves beyond the points of extrusion.

9. An ice cream bar manufacturing apparatus comprising means for forcibly supplying ice cream in form-sustaining plastic condition, said means including a nozzle with openings for extruding the ice cream as bars, in combination with a stick carrier comprising individual stick mounting brackets and means for exerting longitudinal pressure upon sticks mounted in said brackets, whereby said carrier may be positioned in advance of the nozzle with the individual sticks and brackets aligned with the nozzle openings to imbed all of said sticks simultaneously in the ice cream in the course of its continuous extrusion.

10. An ice cream bar manufacturing apparatus comprising means for forcibly supplying ice cream in form-sustaining plastic condition, said means including a nozzle with openings for extruding the ice cream as bars, in combination with a stick carrier positionable in advance of said nozzle and having stick supporting brackets registering with the openings in said nozzle to align the sticks in the course of ice cream extrusion, and a cut-off knife movable between the stick ends and the nozzle openings.

FRANK M. JOHANSEN.

REFERENCES CITED

The following references are of record in the file of this patent:

UNITED STATES PATENTS

| Number | Name | Date |
|---|---|---|
| 96,804 | Hawkins | Nov. 16, 1869 |
| 286,567 | Yancey | Oct. 9, 1883 |
| 797,276 | Glauser | Aug. 15, 1905 |
| 904,421 | Griffin | Nov. 17, 1908 |
| 971,097 | Woolf | Sept. 27, 1910 |
| 2,062,249 | Clearwater | Nov. 24, 1936 |
| 2,062,277 | Routh | Nov. 24, 1936 |
| 2,099,119 | King et al. | Nov. 16, 1937 |
| 2,152,214 | Sattler | Mar. 28, 1939 |
| 2,173,850 | Lockwood | Sept. 26, 1939 |
| 2,278,923 | Grau | Apr. 7, 1942 |